(12) United States Patent
Akasaka

(10) Patent No.: US 7,489,175 B2
(45) Date of Patent: Feb. 10, 2009

(54) CLOCK SUPPLY CIRCUIT AND METHOD

(75) Inventor: Nobuhiko Akasaka, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 167 days.

(21) Appl. No.: 11/391,290

(22) Filed: Mar. 29, 2006

(65) Prior Publication Data

US 2007/0030047 A1 Feb. 8, 2007

(30) Foreign Application Priority Data

Aug. 2, 2005 (JP) ............................. 2005-224402

(51) Int. Cl.
*G06F 1/04* (2006.01)
(52) U.S. Cl. .................... 327/291; 327/34; 327/295
(58) Field of Classification Search ................. None
See application file for complete search history.

(56) References Cited

U.S. PATENT DOCUMENTS 5,563,532 A * 10/1996 Wu et al. .................. 327/34
5,966,034 A * 10/1999 Leon ......................... 327/34
6,061,804 A * 5/2000 Hirai ......................... 713/501
6,535,024 B1 * 3/2003 Rochard .................... 327/34
6,670,832 B1 * 12/2003 Duong ....................... 327/34
7,245,160 B2 * 7/2007 Huang ....................... 327/34

FOREIGN PATENT DOCUMENTS

| JP | 60-249427 | 12/1985 |
| JP | 07-245527 | 9/1995 |
| JP | 09-006462 | 1/1997 |
| JP | 11-027045 | 1/1999 |
| JP | 2001-313547 A | 11/2001 |

* cited by examiner

*Primary Examiner*—Tuan T Lam
(74) *Attorney, Agent, or Firm*—Arent Fox LLP

(57) ABSTRACT

An object is to provide a clock supply circuit capable of supplying a clock signal with a short oscillation stabilization waiting time. There is provided a clock supply circuit having a filter removing from a first clock signal pulses having a shorter pulse width than a threshold value and passing pulses having a longer pulse width than the threshold value to thereby output a second clock signal; and a divider dividing the second clock signal to thereby output a third clock signal.

12 Claims, 4 Drawing Sheets

F I G. 3
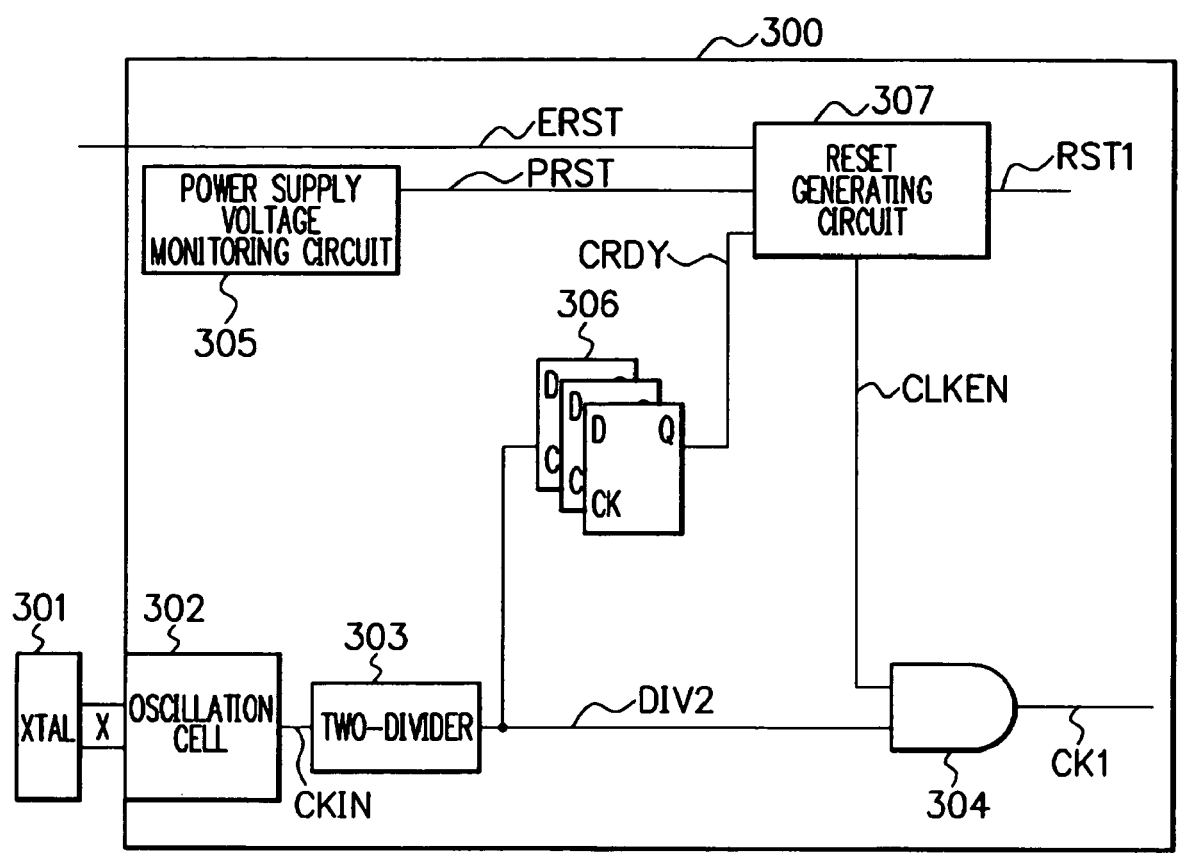

CLOCK SUPPLY CIRCUIT AND METHOD

CROSS-REFERENCE TO RELATED APPLICATIONS

This application is based upon and claims the benefit of priority from the prior Japanese Patent Application No. 2005-224402, filed on Aug. 2, 2005, the entire contents of which are incorporated herein by reference.

BACKGROUND OF THE INVENTION

1. Field of the Invention

The present invention relates to a clock supply circuit and method.

2. Description of the Related Art

To an LSI such as a microcontroller, a quartz oscillator or the like is connected to supply clock signals. While the quartz oscillator has merits such that it is cheap, it needs a small mounting area, and the like, it requires a certain time period for its oscillation to be stable. Also, in some cases, an oscillation circuit may be provided inside an LSI. In such cases, similarly, a certain time period is required for its oscillation to be stable.

A time for oscillation to be stable is determined depending on characteristics of an oscillator and an LSI, a temperature, a voltage, resistance or load on a board, and the like. During this oscillation stabilization waiting time, the operation of an LSI is stopped by measuring a certain time period using a counter mounted inside a microcontroller and supplying an initialization signal to the LSI during the certain time period, or by externally supplying a reset signal that includes a sufficient oscillation stabilization waiting time, or the like. The reset signal is negated at the time when the oscillation is considered to be stable, and the LSI starts operating.

FIG. 3 is a diagram showing a configuration example of an LSI including a clock supply circuit, and FIG. 4 is a timing chart showing an operation example thereof.

When a quartz oscillator 301 is connected to an oscillation cell (oscillation circuit) 302 inside an LSI 300, an oscillation signal X oscillates. The oscillation cell 302 has a transistor, and inputs the oscillation signal X and outputs a clock signal CKIN. The clock signal CKIN is a binary signal representing the oscillation signal X by a high level or a low level depending on a threshold voltage of the transistor.

A two-divider 303 is constituted of a flip-flop and divides the clock signal CKIN in two to output a clock signal DIV2. The frequency of the clock signal DIV2 is ½ of the frequency of the clock signal CKIN. The two-divider 303 is provided for making a duty ratio for the clock signal DIV2 to be 50%.

An oscillation stabilization waiting counter 306 is constituted of a plurality of D-type flip-flops, which counts the number of pulses of the clock signal DIV2 and turns a count completion signal CRDY to a high level and outputs it when the number of pulses exceeds a predetermined value. A power supply voltage monitoring circuit 305 monitors stability of a power supply voltage after a start-up by turning on of power, and turns a reset signal PRST to a low level and outputs it when the power supply voltage becomes stable. A reset signal ERST is an external reset signal that is supplied externally.

A reset generating circuit 307 inputs the reset signals PRST, ERST and the count completion signal CRDY, and outputs a system reset signal RST1 and a clock enable signal CLKEN. The clock enable signal CLKEN turns to a high level after the reset signals PRST and ERST turn to a low level and the count completion signal CRDY turns to a high level.

An AND (logical product) circuit 304 outputs a logical product signal of the clock signal DIV2 and the clock enable signal CLKEN as a system clock signal CK1. Specifically, when the clock enable signal CLKEN is at a low level, the system clock signal CK1 is at a low level. When the clock enable signal CLKEN is at a high level, the system clock signal CK1 is the same as the clock signal DIV2. After the clock enable signal CLKEN turns to a high level and supply of the system clock signal CK1 is started, the system reset signal RST1 turns from a high level to a low level. The low level of the system reset signal RST1 indicates that the system clock signal CK1 is usable.

Responding to turning on of the power, the power supply voltage increases, and the quartz oscillator 301 starts oscillating. At this time, the oscillation signal X starts oscillating with a small amplitude at first, which gradually becomes a large stable amplitude. A waveform of the oscillation signal X with a large amplitude becomes the clock signal CKIN having a normal pulse width, but a waveform of the oscillation signal X with a small amplitude may become the clock signal CKIN having a short pulse width. The two-divider 303 divides the clock signal CKIN in two and outputs the clock signal DIV2. At this time, if the clock signal CKIN has a sufficiently large pulse width, the clock signal DIV2 toggles at a rising edge of a pulse of the clock signal CKIN. In other words, by synchronizing with rising of the clock signal CKIN, the clock signal DIV2 logically inverts between a high level and a low level. However, when the clock signal CKIN has a short pulse width, the two-divider 303 may fail to operate, which makes the clock signal DIV2 inconstant.

At the time when the power is turned on, the power supply voltage monitoring circuit 305 asserts (turns to a high level) the reset signal PRST. The oscillation stabilization waiting counter 306 counts the number of pulses of the clock signal DIV2, and turns the count completion signal CRDY to a high level and outputs it when the number of pulses reaches a predetermined value. Note that when the clock signal DIV2 becomes inconstant, the output signal CRDY of the counter 306 does not necessarily become accurate. Therefore, the predetermined value needs to be sufficiently long.

When the reset signal PRST is asserted (turned to a high level), a reset generating circuit 307 asserts (turns to a high level) the system reset signal RST1. When the count completion signal CRDY turns to a high level, the reset generating circuit 307 asserts (turns to a high level) the clock enable signal CLKEN, and starts supplying the system clock signal CK1. Also, thereafter, the reset generating circuit 307 negates (turns to a low level) the system reset signal RST1. An oscillation stabilization waiting time 401 from this turning on of the power until the negating of the system reset signal RST1 needs to be a few milliseconds to a few tens of milliseconds.

In addition, Patent Document 1 listed below describes a clock supply circuit having a PLL output stabilization detecting circuit which detects, when a PLL-type frequency multiplying circuit returns from a clock supply halt state in which it is halted and clock supply is stopped, whether a multiplication clock signal outputted from the PLL-type frequency multiplying circuit is stable or not, and transmits the multiplication clock signal as a system clock signal to an integrated circuit when it detects that the multiplication clock signal is stable.

[Patent document 1] Japanese Patent Application Laid-open No. 2001-313547

The oscillation stabilization waiting time 401 needs to be determined by anticipating the worst value, which is a time that cannot be neglected as a start-up time for the LSI 300. When the quartz oscillator 301 is used, it requires a few milliseconds to a few tens of milliseconds. Therefore, from turning on of the power until the LSI 300 becomes operable, at least a few milliseconds to a few tens of milliseconds are needed.

A program mounted on the LSI such as a microcontroller generally performs initialization of a RAM, development of a program from a low speed ROM to a high speed RAM, and the like immediately after a start-up thereof. After these initialization operations are completed, a main program starts operating. Since also these initialization operations are necessary at the time when turning on the power, a longer time is needed until the main program becomes able to start operating.

SUMMARY OF THE INVENTION

An object of the present invention is to provide a clock supply circuit and method capable of supplying a clock signal with a short oscillation stabilization waiting time.

According to an aspect of the present invention, there is provided a clock supply circuit having: a filter removing from a first clock signal pulses having a shorter pulse width than a threshold value and passing pulses having a longer pulse width than the threshold value to thereby output a second clock signal; and a divider dividing the second clock signal to thereby output a third clock signal.

BRIEF DESCRIPTION OF THE DRAWINGS

FIG. 3 is a diagram showing a configuration example of an LSI including a clock supply circuit.

DETAILED DESCRIPTION OF THE PREFERRED EMBODIMENTS

Figure 1:
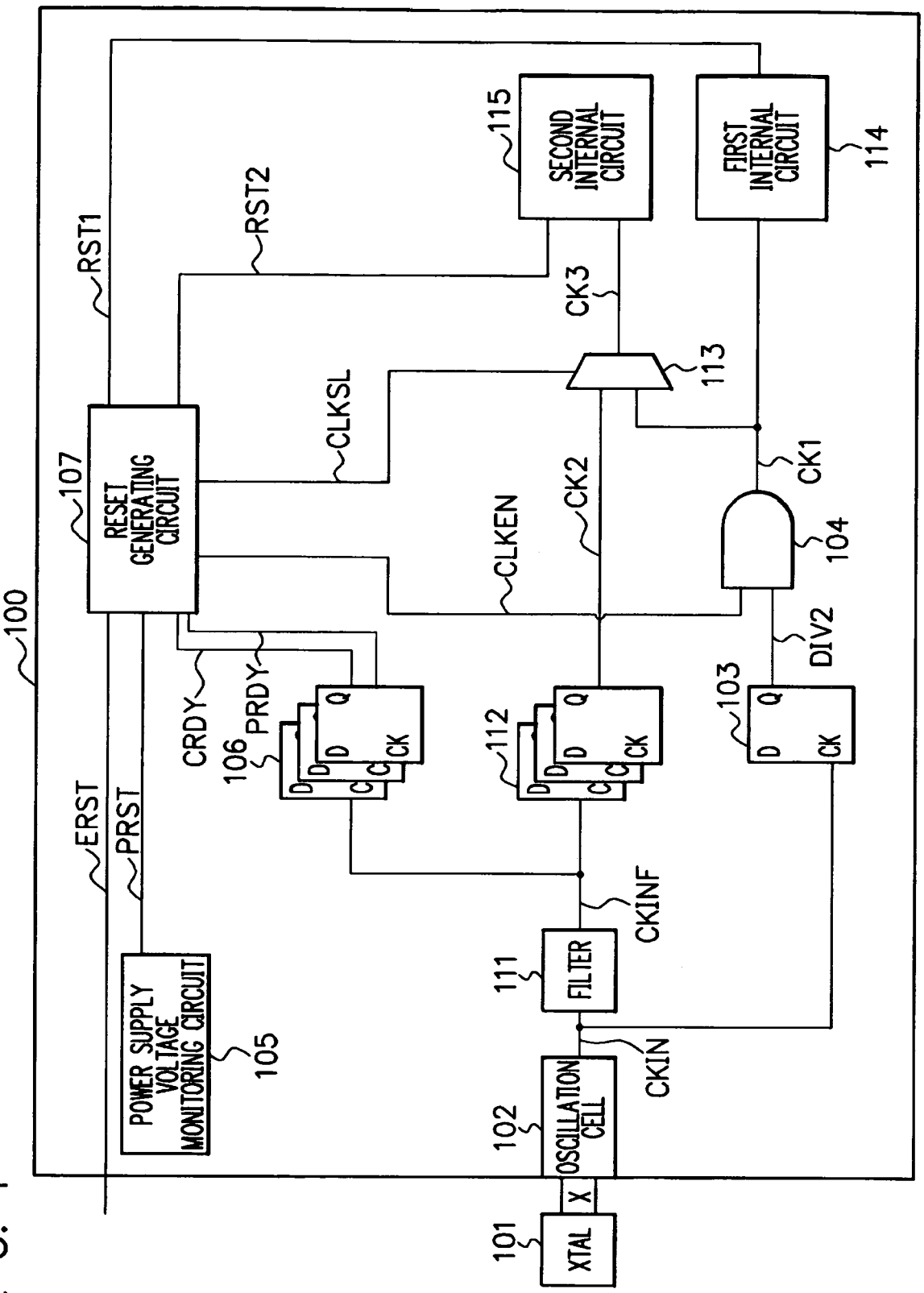
FIG. 1 is a diagram showing a configuration example of an LSI including a clock supply circuit according to an embodiment of the present invention.
Figure 2:
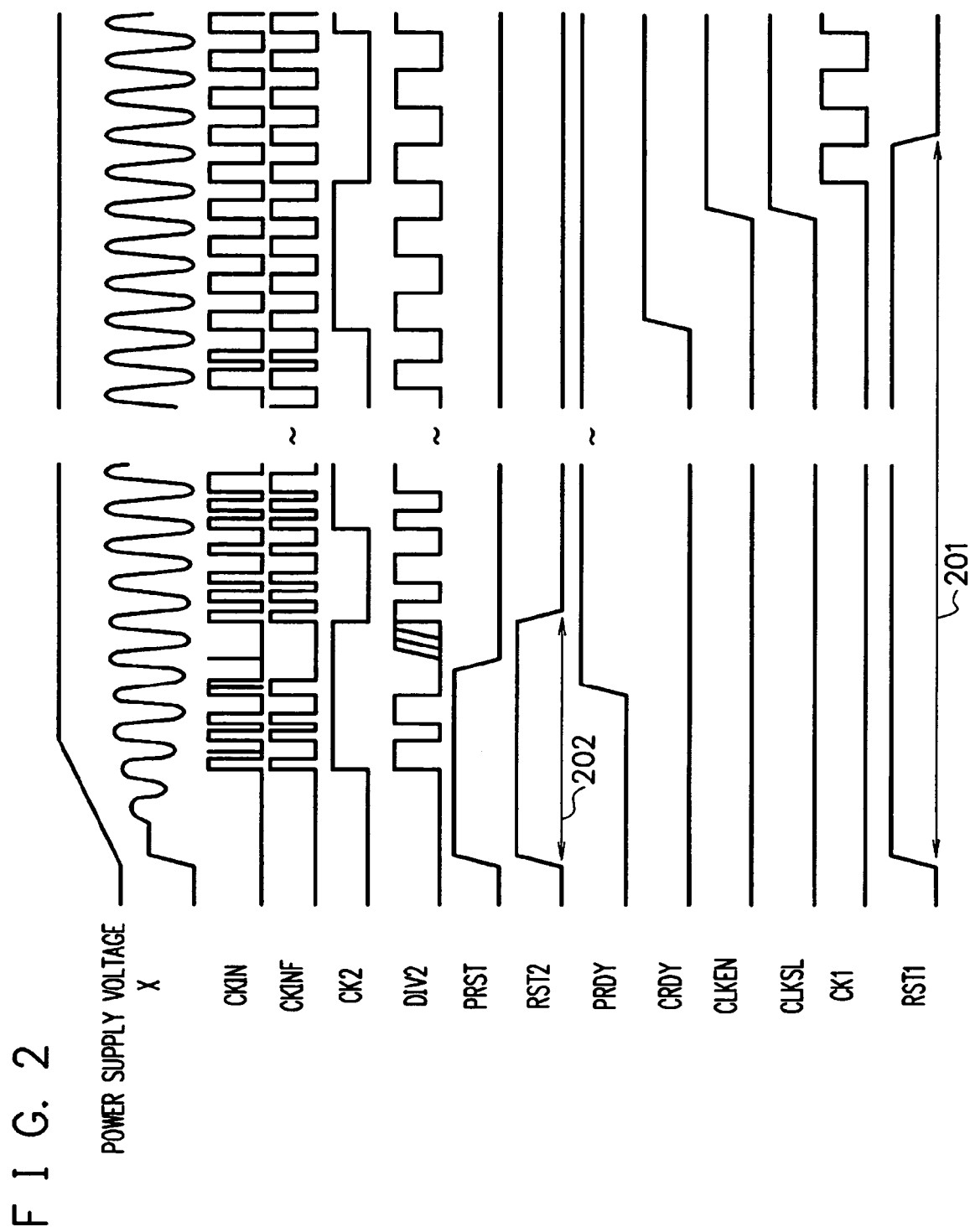
FIG. 2 is a timing chart showing an operation example of the LSI of FIG. 1.

FIG. 1 is a diagram showing a configuration example of an LSI including a clock supply circuit according to an embodiment of the present invention, and FIG. 2 is a timing chart showing an operation example thereof.

When a quartz oscillator 101 is connected to an oscillation cell (oscillation circuit) 102 inside an LSI 100, an oscillation signal X oscillates. The oscillation cell 102 has a transistor, and inputs the oscillation signal X and outputs a clock signal CKIN. The clock signal CKIN is a binary signal representing the oscillation signal X by a high level or a low level depending on a threshold voltage of the transistor.

The two-divider 103 is constituted of a D-type flip-flop, and divides the clock signal CKIN in two to output a clock signal DIV2. The frequency of the clock signal DIV2 is ½ of the frequency of the clock signal CKIN. The two-divider 103 is provided for making a duty ratio for the clock signal DIV2 to be 50%. The two-divider 103 may be omitted. In such cases, the clock signal DIV2 is the same as the clock signal CKIN. Also, the two-divider 103 may input a clock signal CKINF instead of the clock signal CKIN.

The output of the oscillation cell 102 is connected to an analog filter 111. The analog filter 111 removes from the clock signal CKIN pulses having a shorter pulse width than a threshold value and passes pulses having a longer pulse width than the threshold value to thereby output the clock signal CKINF. Specifically, the analog filter 111 removes pulses having a short pulse width which cannot enable a divider 112 and a flip-flop constituting an oscillation stabilization waiting counter 106 in the subsequent stage to operate. Here, for example, if the shortest pulse width which enables the flip-flop to operate is 1 nanosecond, the analog filter 111 only removes pulses having a pulse width shorter than 1 nanosecond.

The divider 112 divides the clock signal CKINF to generate a divided clock signal CK2. The dividing ratio of the divider 112 is obtained from (the highest operating frequency of the LSI 100)/(the highest frequency of the clock signal CKINF). The divider 112 performs dividing by a necessary dividing ratio thereof. For example, it is assumed that the highest operating frequency of the LSI 100 (for example a first internal circuit 114 and a second internal circuit 115) is 100 MHz. From the clock signal CKINF, pulses having a shorter pulse width than 1 nanosecond are removed by the analog filter 111. Therefore, the shortest cycle of the clock signal CKINF is 1 nanosecond×2=2 nanoseconds, so that the highest frequency of the clock signal CKINF is 500 MHz. Thus, the dividing ratio of the divider 112 is 100 MHz/500 MHz=⅕, which means that the divider 112 should divide at least by 5. In this case, the divided clock signal CK2 is 100 MHz. In the case of ripple carry type divider, which is one of preferable examples, divisions by $2^n$ can be obtained, so that dividing by 8 is the optimum dividing ratio.

Note that during an initial stage of oscillation, the clock signal CKINF has an unstable cycle and has a high frequency. For example, the clock signal CKINF has a highest frequency of approximately 500 MHz at the initial stage of oscillation-and then becomes stable with a frequency of 200 MHz at a stable stage of oscillation thereafter.

The oscillation stabilization waiting counter 106 is constituted of a plurality of D-type flip-flops, which counts the number of pulses of the clock signal CKINF and turns a first count completion signal PRDY to a high level and outputs it when the number of pulses exceeds a first predetermined value ($2^4$=16 for example) and turns a second count completion signal CRDY to a high level and outputs it when the number of pulses exceeds a second predetermined value ($2^{17}$=131072 for example). A power supply voltage monitoring circuit 105 monitors stability of a power supply voltage after a start-up by turning on of power, and turns a reset signal PRST to a low level and outputs it when the power supply voltage becomes stable. A reset signal ERST is an external reset signal that is supplied externally.

A reset generating circuit 107 inputs the reset signals PRST, ERST and the count completion signals PRDY, CRDY, and outputs a system reset signal RST1, an early reset signal RST2, a clock enable signal CLKEN and a clock select signal CLKSL. The early reset signal RST2 turns from a high level to a low level after the reset signals PRST and ERST turn to a low level and the first count completion signal PRDY turns to a high level.

The clock enable signal CLKEN and the clock select signal CLKSL turn from a low level to a high level after the reset signals PRST and ERST turn to a low level and the second count completion signal CRDY turns to a high level.

A AND (logical product) circuit 104 outputs a logical product signal of the clock signal DIV2 and the clock enable signal CLKEN as a system clock signal CK1. Specifically, when the clock enable signal CLKEN is at a low level, the system clock signal CK1 becomes a low level. When the clock enable signal CLKEN is at a high level, the system clock signal CK1 becomes the same as the clock signal DIV2. After the clock enable signal CLKEN turns to a high level and supply of the system clock signal CK1 is started, the system reset signal RST1 turns from a high level to a low level. The first internal circuit 114 inputs the system clock signal CK1 and the system reset signal RST1 and operates. The low level of the system reset signal (enable signal) RST1 indicates that the system clock signal CK1 is usable.

A selector 113 selects the system clock signal CK1 or the divided clock signal CK2 depending on the clock select signal CLKSL and outputs it as a clock signal CK3. When the clock select signal CLKSL is at a low level, the divided clock signal CK2 is outputted as the clock signal CK3. When the clock select signal CLKSL is at a high level, the system clock signal CK1 is outputted as the clock signal CK3. In other words, the selector 113 selects the divided clock signal CK2 until the oscillation becomes stable, and selects the system clock signal CK1 after the oscillation became stable. The selector 113 selects and outputs the divided clock signal CK2 until the count value of a counter reaches a first count value, and selects and outputs the system clock signal CK1 after the first count value is reached. The second internal circuit 115 inputs the clock signal CK3 and the early reset signal RST2 and operates. The low level of the early reset signal (enable signal) RST2 indicates that the clock signal CK3 (divided clock signal CK2) is usable.

Responding to turning on of the power, the quartz oscillator 101 starts oscillating. At this time, the oscillation signal X starts oscillating with a small amplitude at first, which gradually becomes a large stable amplitude. A waveform of the oscillation signal X with a large amplitude becomes the clock signal CKIN having a normal pulse width, but a waveform of the oscillation signal X with a small amplitude may become the clock signal CKIN having a short pulse width. The analog filter 111 removes this pulse having a short pulse width to thereby generate the clock signal CKINF.

The divider 112 divides the clock signal CKINF by 8 for example to generate the divided clock signal CK2. Thus, the divided clock signal CK2 becomes a pulse having a sufficiently long cycle for the LSI 100 to operate though this cycle is not constant. Prior to the operation of the system of the LSI 100, necessary initialization operations and the like operate with this divided clock signal CK2.

At the time when the power is turned on, the power supply voltage monitoring circuit 105 asserts (turns to a high level) the reset signal PRST. Thus, the reset generating circuit 107 asserts (turns to a high level) the system reset signal RST1 and the early reset signal RST2. When the reset signal PRST is negated. (turned to a low level), the early reset signal RST2 is also negated (turned to a low level).

The oscillation stabilization waiting counter 106 counts the number of pulses of the clock signal CKINF, and outputs the first count completion signal PRDY when the number of pulses reaches the first predetermined value and outputs the second count completion signal CRDY when the number of pulses reaches the second predetermined value. Due to generation of the first count completion signal PRDY, the reset generating circuit 107 negates (turns to a low level) the early reset signal RST2. Also, due to generation of the second count completion signal CRDY, the reset generating circuit 107 asserts (turns to a high level) the clock enable signal CLKEN, and starts supplying the system clock signal CK1. Also, when the clock select signal CLKSL turns to a high level, the selector 113 selects the system clock signal CK1 and outputs it. Thereafter, the reset generating circuit 107 negates (turns to a low level) the system reset signal RST1.

As described above, at the initial stage of oscillation, the pulse width of the clock signal CKIN may become short. In this embodiment, since pulses having a short pulse width are removed by the analog filter 111, the clock signal CKINF has a pulse having a sufficiently long pulse width. Accordingly, operation failure of the divider 112 and the oscillation stabilization waiting counter 106 is prevented, and thus the stable divided clock signal CK2 and count completion signals PRDY, CRDY can be generated. Since the stable clock signal DIV2 can be generated and also the count completion signals PRDY, CRDY become accurate, the first and second predetermined values to be counted by the counter 106 are not needed to be longer than necessary. Accordingly, the reset signals RST1 and RST2 can be negated (turned to a low level) early, and the clock signals CK1 and CK2 can be made usable early.

A period in which the early reset signal RST2 is at a low level and the system reset signal RST1 is at a high level is an initial period of oscillation, and during this period, the second internal circuit 115 uses the divided clock signal CK2 as the clock signal CK3. At this moment, the clock signal CKINF has a high frequency (500 MHz for example). When the dividing ratio of the divider 112 is ⅕, the clock signals CK2 and CK3 become 100 MHz. The second internal circuit 115 can use the clock signal CK3 of 100 MHz.

When the LSI 100 is a microcontroller or the like, a program mounted on the LSI 100 performs initialization of a RAM, development of a program from a low speed ROM to a high speed RAM, and the like immediately after a start-up thereof. The second internal circuit 115 can perform these initialization operations during the above-described initial period of oscillation and allows a main program to operate thereafter. Accordingly, the second internal circuit 115 can start the initialization operations early and finish them early.

A period in which the system reset signal RST1 is at a low level after the initial period of oscillation is a stable period of oscillation, in which the second internal circuit 115 uses the system clock signal CK1 as the clock signal CK3. At this time, the clock signal CKINF has a low frequency (200 MHz for example). Since the dividing ratio of the two-divider 103 is ½, the clock signals CK1 and CK3 become 100 MHz. The second internal circuit 115 uses the clock signal CK3 of 100 MHz and is able to perform processing of a main program for example.

Figure 4:
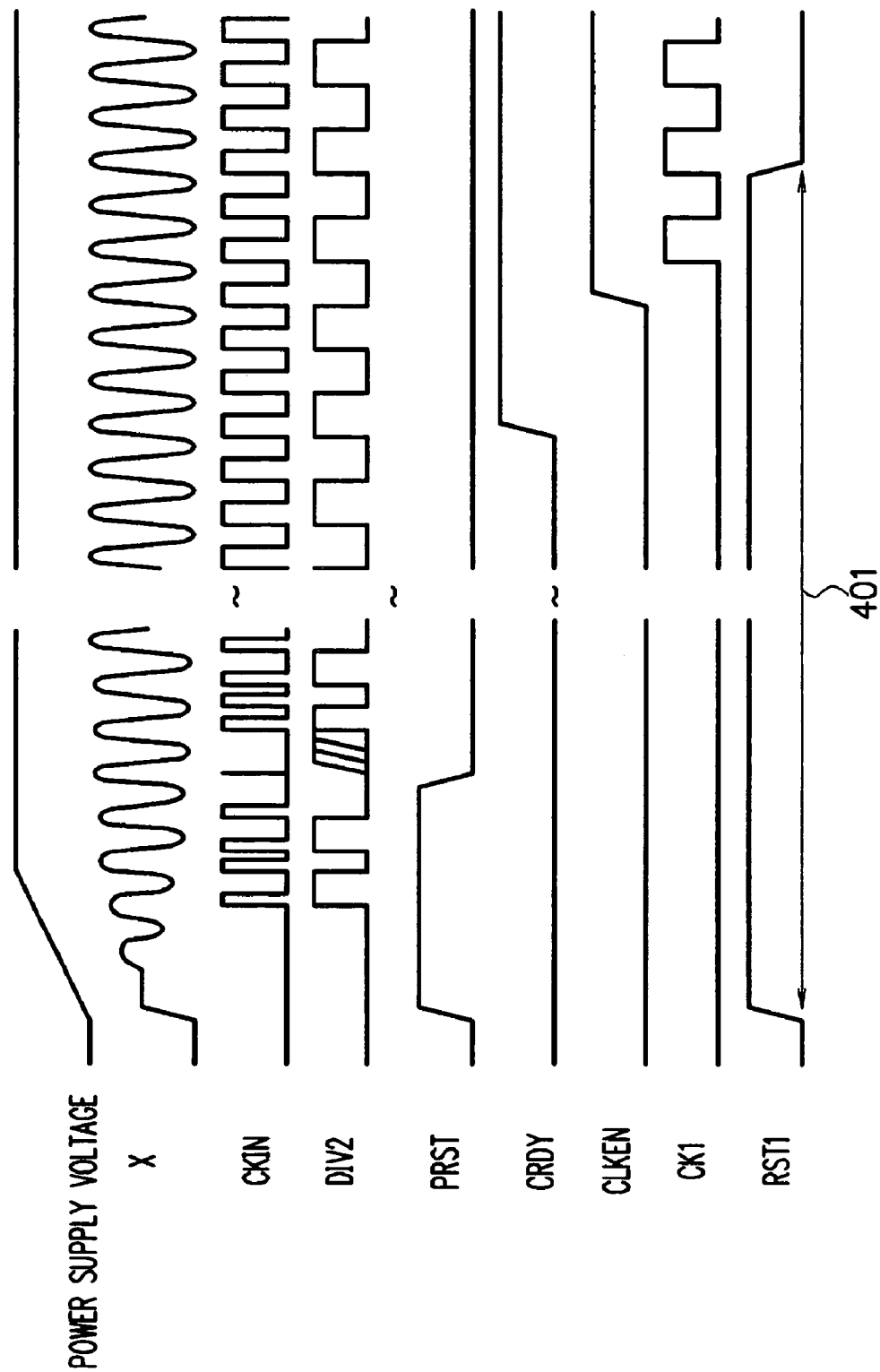
FIG. 4 is a timing chart showing an operation example of the LSI of FIG. 3.

In the case of FIG. 4, an oscillation stabilization waiting time 401 from turning on of the power until the system reset signal RST1 becomes a low level needs to be a long time (a few milliseconds to a few tens of milliseconds).

In this embodiment, the first internal circuit 114 that is not required to perform early processing uses the system clock signal CK1 and the system reset signal RST1, and the second internal circuit 115 that is required to perform early processing can use the clock signal CK3 and the early reset signal RST2. The first internal circuit 114 can use the system clock signal CK1 after a period 201 is passed, which is from turning on of the power until the system reset signal RST1 turns to a low level.

The second internal circuit 115 can use the clock signal CK3 after a short period 202 is passed, which is from turning on of the power until the early reset signal RST2 turns to a low level. According to this embodiment, the clock signal CK3 (CK2) with the short oscillation stabilization waiting time 202 can be supplied. The clock signal CK3 (CK2) can become usable earlier than the clock signal CK1. The clock signal CK3 uses the divided clock signal CK2 in the initial period of oscillation and uses the system clock signal CK1 in the stable period of oscillation. The dividing ratio of the divider 103 is ½, and the dividing ratio of the divider 113 is ⅕ or ⅛. Since the dividing ratio of the divider 112 is smaller than the dividing ratio of the divider 103, the system clock signal CK1 has a higher frequency than that of the divided clock signal CK2.

As above, according to this embodiment, the analog filter 111 is inserted, the formed clock signal CKINF from which pulses having a short width are removed is generated, and a divider 112 constituted of one or more flip-flops is provided for dividing this formed clock signal CKINF. The clock signal CK2 outputted by the divider 112 is supplied to the second internal circuit 115, thereby enabling it to operate.

The analog filter 111 only passes pulses having a width equal to or wider than a pulse that enables the flip-flop constituting the divider 112 to operate. Thus, the flip-flop of the divider 112 operates properly.

The divider 112 divides the formed clock signal CKINF so that it becomes a frequency equal to or lower than the highest frequency to enable the second internal circuit 115 to operate. The dividing ratio required for the divider 112 is (the highest frequency to enable the second internal circuit 115 to operate)/(the highest frequency of the formed clock signal CKINF). Here, the shortest cycle of the formed clock signal CKINF becomes two times the pulse width that can pass through the analog filter 111, so that the highest frequency of the formed clock signal CKINF is 1/(the shortest pulse width that can pass through the analog filter 111×2). When the shortest pulse that can pass through the analog filter 111 is 1 nanosecond, the highest frequency of the clock signal CKINF is 500 MHz.

In this embodiment, for predicting stabilization of clock oscillation, the counter 106 is provided. When the counter 106 reaches a certain value, it is assumed that the clock oscillation became stable. While the oscillation is not stable, the clock signal CK2 outputted by the divider 112 is supplied to the second internal circuit 115, and after the oscillation became stable, the clock signal CK1 that does not pass through the divider 112 is supplied to the second internal circuit 115.

While the oscillation is not stable, not necessarily all the functions in the LSI 100 should operate, where only the second internal circuit 115 needs to operate, which performs transferring from a low speed memory to a high speed memory, initializing memories and the like for example. Accordingly, only to the second internal circuit 115 needed for these operations, the clock signal CK2 outputted by the divider 112 is allowed to be supplied. Also, at the same time, the second internal circuit 115 to which the clock signal CK2 outputted by the divider 112 is supplied and a circuit other than the second internal circuit 115, namely the first internal circuit 114, use the different reset signals (initialization signals) RST2 and RST1, respectively. For the first internal circuit 114, the reset signal RST1 is negated (turned to a low level) after the oscillation became stable.

As above, according to this embodiment, it is possible to generate the clock signal CK2 capable of operating safely even before the oscillation of a clock becomes stable, and the start-up time of a system can be largely reduced by performing operations not depending on the cycle of a clock in advance. Also, it is possible to effectively utilize the oscillation stabilization waiting time of a clock signal that is supplied externally or internally.

A clock signal with a short oscillation stabilization waiting time can be supplied. Accordingly, an LSI or the like which operates based on a clock signal can start initialization operations early and finish them early.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A clock supply circuit, comprising:
   a filter for removing pulses having a shorter pulse width than a threshold value from a first clock signal pulses and passing pulses having a longer pulse width than the threshold value to output a second clock signal;
   a divider dividing the second clock signal to output a third clock signal; and
   a clock output unit outputting the first clock signal as a fourth clock signal without change or generating and outputting a fourth clock signal based on the first clock signal, wherein the fourth clock signal is generated based on the first clock signal without having the first clock signal pass through the filter,
   wherein a frequency of the fourth clock signal is a higher frequency than a frequency of the third clock signal.

2. The clock supply circuit according to claim 1, further comprising:
   selector selecting and outputting the third clock signal or the fourth clock signal.

3. The clock supply circuit according to claim 2,
   wherein said selector selects and outputs the third clock signal until a count value of a counter reaches a first count value, and selects and outputs the fourth clock signal after the first count value is reached.

4. The clock supply circuit according to claim 2, further comprising:
   an enable signal generating circuit generating a first enable signal indicating that the third clock signal is usable and a second enable signal indicating that the fourth clock signal is usable,
   wherein the third clock signal becomes usable earlier than the fourth clock signal.

5. The clock supply circuit according to claim 4, further comprising:
   a power supply voltage monitoring circuit monitoring stability of a power supply voltage after a start-up,
   wherein said enable signal generating circuit generates the first and second enable signals indicating that the third and fourth clock signals are usable after the power supply voltage becomes stable.

6. The clock supply circuit according to claim 4,
   wherein a clock signal outputted by said selector and the first enable signal are supplied to a first circuit, and the fourth clock signal and the second enable signal are supplied to a second circuit.

7. A clock supply method, comprising:
   a filtering step of removing pulses having a shorter pulse width than a threshold value from a first clock signal and passing pulses having a longer pulse width than the threshold value to output a second clock signal;
   a dividing step of dividing the second clock signal to output a third clock signal; and
   a clock outputting step of outputting the first clock signal as a fourth clock signal without change or generating and outputting a fourth clock signal based on the first clock signal, wherein the fourth clock signal is generated based on the first clock signal without filtering the first clock signal,
   wherein a frequency of the fourth clock signal is a higher frequency than a frequency of the third clock signal.

8. The clock supply method according to claim 7, further comprising:
   a selecting step of selecting and outputting the third clock signal or the fourth clock signal.

9. The clock supply method according to claim 8,
wherein said selecting step selects and outputs the third clock signal until a count value of a counter reaches a first count value, and selects and outputs the fourth clock signal after the first count value is reached.

10. The clock supply method according to claim 8, further comprising:
an enable signal generating step of generating a first enable signal indicating that the third clock signal is usable and a second enable signal indicating that the fourth clock signal is usable,
wherein the third clock signal becomes usable earlier than the fourth clock signal.

11. The clock supply method according to claim 10,
wherein said enable signal generating step generates the first and second enable signals indicating that the third and fourth clock signals are usable after a power supply voltage becomes stable after a start-up.

12. The clock supply method according to claim 10,
wherein a clock signal selected and outputted by said selecting step and the first enable signal are supplied to a first circuit, and the fourth clock signal and the second enable signal are supplied to a second circuit.

\* \* \* \* \*